United States Patent [19]

Thornton et al.

[11] 4,287,246

[45] Sep. 1, 1981

[54] MULTIZONAL FIBER DISTRIBUTION

[75] Inventors: Alan Thornton, Halifax; John S. Uttley, Hebden Bridge, both of England

[73] Assignee: Bondina, Ltd., Yorkshire, England

[21] Appl. No.: 740,461

[22] Filed: Nov. 10, 1976

Related U.S. Application Data

[63] Continuation of Ser. No. 571,887, Apr. 25, 1975, abandoned.

[51] Int. Cl.³ .................. B32B 5/12; B32B 5/06; H41D 27/02
[52] U.S. Cl. .................................... 428/113; 2/97; 2/272; 28/103; 28/107; 428/195; 428/212; 428/300; 428/302; 428/332
[58] Field of Search .............. 428/195, 212, 284, 298, 428/299, 300, 301, 302, 105, 113; 427/288; 28/72.2 R, 107, 103; 2/272, 243 R, 243 B, 97

[56] References Cited

U.S. PATENT DOCUMENTS

| 3,206,351 | 9/1965 | Smith | 428/300 |
| 3,703,730 | 11/1972 | Miller | 2/272 |
| 4,016,319 | 4/1977 | Marshall | 428/113 |

FOREIGN PATENT DOCUMENTS

| 2055514 | 5/1972 | Fed. Rep. of Germany | 2/272 |
| 928270 | 6/1963 | United Kingdom . | |
| 1439426 | 6/1976 | United Kingdom | 2/272 |

*Primary Examiner*—Paul J. Thibodeau

[57] ABSTRACT

An interlining material comprising a non-woven web of fibers wherein the area of the web comprises at least two distinct zones, each of which said zones has substantially uniform fiber content and extends across the width of said interlining, and in which adjacent zones have different fiber contents, the fibers of said zones merging into the fibers of each adjacent said zone; a method for making an interlining which comprises disposing a first fibrous fleece over a second fibrous fleece so as to define a web having at least two distinct zones, each of which zones have substantially uniform fiber content and adjacent said zones having different fiber contents, and thereafter randomizing the distribution of fibers through the web and merging the fibers of said first fibrous fleece with the fibers of said second fibrous fleece.

16 Claims, 2 Drawing Figures

MULTIZONAL FIBER DISTRIBUTION

This is a continuation of application Ser. No. 571,887, filed Apr. 25, 1975, now abandoned.

BACKGROUND OF THE INVENTION

1. Field of the Invention

This invention relates to interlining material, particularly interlining material used in garment manufacture. More especially, this invention relates to a unitary interlining material having distinct zones of different fiber content, each zone having uniform fiber content therein. The fiber content of the zones varies so as to impart to the unitary material different bending characteristics. This invention is also directed to a method of making the interlining material from non-woven fleece material.

2. Discussion of the Prior Art

A non-woven web must normally be of uniform fiber density across its width and in particular it is essential that it does not have random variations in fiber density. Accordingly processes and machinery for making non-woven webs have been designed with the object of giving complete uniformity in fiber density across the width of the webs. For example in one common method a batt of fibers is carded to form a substantially uniform fleece and then this is folded upon itself with a cross lapper to give a fiber distribution that is uniform across the width of the fleece but is not random through its thickness: instead it is laminar. Machines such as that sold under the name "Rando-Webber" produce in a single operation a web that is uniform across its width provided the feed into the machine is reasonably uniform and in which the fibers are randomly distributed through its thickness and in which the fibers are orientated randomly but with some tendency to be disposed in the machine direction or sometimes to some extent in the machine direction.

Non-woven and other interlining fabrics have in the past usually had uniform properties across their area but recently a demand has arisen for multizonal interlinings, that is to say fabrics that have, across their area, zones of differing properties, especially stiffness and handle. These permit a single piece of interlining to be used in a garment, for instance a mantle such as a coat or jacket requiring interlinings having different properties in different areas. Thus a suitable multizonal interlining should have a bulky, firm rounding effect across the chest area of a coat or jacket with good rolling properties down the length of the garment.

It is known to reinforce non-woven webs by applying fibrous reinforcement, for example threads, to the surface of it but this does not provide the multizonal variation in bulk that is required, and also it can be rather difficult to secure them in position. A process of making a web having variable fiber content across its width is described in British patent specification No. 928,270 which relates to a process for making fibrous pads. Thus the web in this instance will generally be rather thick and several webs will probably be laid on one another to make a pad. Clearly the requirements of pad formation are very different from those of the formation of an interlining, since the latter requires a higher degree of surface smoothness and uniformity. Any gross distortions in the surface would render it unacceptable for use as an interlining.

Probably for this reason so far as we are aware no-one has ever proposed that a satisfactory interlining could be made having a variable fiber content across its width.

It has therefore become desirable to provide non-woven webs having distinct zones therein wherein the fiber content of each zone is uniform within the zone itself but is different from one zone to another. It has become particularly desirable to provide such a non-woven fabric wherein the fibers of one zone are merged with the fibers of another zone particularly a non-woven fibrous interwoven material wherein at the margin of the merging of the fibers of one zone with the fibers of the other zone there is formed a small but distinct area in and of itself. It has also become desirable to provide a process for making such non-woven webs which can be carried out employing known apparatuses and does not require substantial manpower in the operation of the apparatuses. It has become particularly desirable to provide such an interlining material for use in garment manufacture particularly in the breast area of suits, jackets and coats.

SUMMARY OF THE INVENTION

In accordance with this invention there is provided an interlining material comprising a non-woven web of fibers having at least two distinct zones, one of said zones having a different fiber content than the other of said zones. Particularly contemplated is a non-woven material comprising a non-woven web of fibers having at least three distinct zones wherein two of said zones have the same uniform fiber content, said zones being separated by a third zone having a different fiber content, the fibers of said third zone merging with the fibers of a zone juxtaposed thereto. It is to be understood that the distinct zones of the interlining extend across the width of the web, i.e., they run generally parallel to one another in the longitudinal direction of the web.

This invention also contemplates a method of making an interlining of the type described comprising disposing a first fibrous fleece, e.g., a fibrous fleece of a staple fiber, over a second fibrous fleece, which can also be of staple fibers, so as to define a web having distinct zones wherein the zones have uniform fiber content therein but zones adjacent to one another have a different fiber content.

Especially contemplated is a method of making an interlining material having three distinct zones wherein two of said zones have the same fiber content and are separated by a third fibrous zone of different fiber content by disposing a first fibrous fleece of staple fibers over a second fleece of staple fibers so as to define a web having at least three distinct zones, two of which have the same fiber content, zones adjacent to one another having different fiber content and thereafter randomizing the distribution of fibers throughout the web and merging the fibers of one fleece with the fibers of the other fleece.

In accordance with this invention an interlining material is provided which can be thought of as having first zones, each of which has substantially uniform fiber content and in which adjacent first zones have different fiber content and merge into one another.

As a result of having the zones of different fiber content multizonal variations in properties, for example, stiffness and handle, are provided, but as a result of having the zones merging into one another there is no sudden and unacceptable change in properties and appearance at any point.

Each of the zones is generally at least 10 cm. wide, for example 15 cm. or more. The width of the area where adjacent zones merge into each other is usually at least 3 cm. and most usually from 5 to 10 cm., or more. Thus in this area there is a mixture of fiber contents with the mixture changing across the width of the merging area from the fiber content of one zone to the fiber content of the other zone.

The difference in fiber content may involve using different amounts of the same fiber or fiber blend in adjacent zones, but it is generally preferred that adjacent zones should contain different fibers or fiber blends. Thus the difference may be in, for example, length or denier of fiber or in the chemical constitution of the fiber. Any fiber that is customarily used for the formation of non-woven interlinings can be used in the invention. Fibers in adjacent zones may be differently colored.

The interlining material is preferably in the form of a continuous length, or is cut from such a length, in which event the zone will extend in the length, or machine, direction. Preferably the fibers in the web have a tendency towards being oriented in the length direction, as this improves the properties of the interlining when it is cut for a mantle across the machine direction.

The interlining may be made from continuous filaments or from staple fibers. For example continuous filaments can be continuously spun onto a carrier from a spinneret which is designed, and sometimes moved during spinning, in such a way that the web that is collected on the carrier has the desired multizonal fiber distribution. For instance a single linear spinneret might be used which provides coarser filaments in the center of the line of orifices than at the ends of the line and this may then be swung during spinning so as to ensure that there is some merging between the zone of coarser filaments with the outer zones of finer filaments.

Preferably, however, the web is formed of staple fibers. Various ways of forming a web having the specified multizonal fiber distribution from these may be used. For instance, two pre-formed webs may be laid on top of one another in any arrangement that provides that the resultant web has zones of different fiber content. For instance a narrow web may be laid centrally over a wider web or two webs of substantially equal width may be laid offset from one another.

Unless any subsequent treatment to form a merging area between adjacent zones is provided, as is described below, it is necessary that the edges of such webs should be sufficiently diffuse that the desired merging area is provided. For instance a fleece as it emerges from a card, Rando Webber, or other fleece-forming apparatus generally does have a sufficiently diffuse edge that if it is laid on another fleece the different zones do merge into one another. However, if a fleece is cross-laid onto another fleece some deliberate step may have to be taken to ensure that the desired merging is achieved. It is not necessary to start from pre-formed fleeces. For instance a multizonal web can be formed in a single operation by feeding into a fleece-laying card different amounts of fibers across the width of the card, for example by having independently fed hoppers across the card. Similarly a pneumatic web former could be used having differential air flow through the condensing drum so as to give a zonal distribution of fibers.

Particularly when the multizonal web is being formed from pre-formed fleeces, it is generally necessary to intermingle the fibers of the adjacent layers so as to prevent delamination. For instance the multizonal web could be needled by passage through a conventional needle punch loom.

A particularly preferred method of the invention comprises forming a laminar web of two or more fleeces, the area of the web comprising first zones each of which has substantially uniform fiber composition and in which adjacent first zones have different fiber contents, and then randomizing the distribution of fibers through the web and thereby ensuring that the first zones merge into one another.

Thus the laminar fleece may be made by laying on a conventional uniform fleece one or more other conventional uniform fleeces in part or parts of the surface area only of the first fleece, so as to form a composite fleece having a laminar structure through its thickness, and then randomizing the composite fleece until the distribution of fibers through the thickness of the resultant product is uniform.

This step also has the advantage that it promotes orientation of the fibers in the length direction of the web.

The starting fleeces can be preformed fleeces or they can be formed in situ in the composite fleece. They can have random fiber distritution through their thickness or one or more of them can itself have a laminar construction. For example one or more of the fleeces can be formed in a machine such as a "Rando Webber". Preferably, however, one or more of the fleeces is made on a card. When, for instance, two fleeces are being built up into a web one fleece can be fed in the length direction of the web while the other can be laid by a cross lapper on top of the first, or vice versa, or both can be laid in the length direction of the web or, as is preferred, both can be laid by a cross lapper in the width direction of the web, i.e., are cross laid. Having formed the composite fleece the fiber distribution is then randomized by passage through any suitable apparatus. The step of randomizing the fibers through the thickness of the web necessarily involves displacing the fibers to some extent across the width of the web and this has the advantage that it eliminates any abrupt change in fiber content that there might otherwise have been between one zone and the next.

Methods of randomizing that may be used include mechanical methods, in which the composite fleece is restructured by contact with, for example, card wire or needles that move in the length of the fleece, or the composite fleece may be broken up and air laid, for example in methods similar to that by which the initial fleeces can be made provided the air flow does not result in too much spreading of the fibers. A suitable apparatus is the Proctor Isomizer System, for example as described in the Proctor and Schwartz, Inc. Bulletin 549-1/72.

Another suitable apparatus is a Garnett machine. This may comprise a single swift and single doffer and can, but does not have to, include additionally a randomizing roller similar to the "Isomizer" roller in the Proctor apparatus described above. Another suitable apparatus would be the Rando Webber in which event the Rando Feeder would be removed and the composite fleece would be fed direct into the machine.

Another apparatus that can be used is the Duoformer machine made by Proctor and Schwartz, Inc. The composite fleece would be fed into the entry end of the machine, which is really a modified garnett having a random air laying device at the delivery end to effect randomization.

The step of randomizing generally results in intermingling of fibers throughout the thickness of the web, so that any initial laminar structure is destroyed. However, a machine such as the Proctor Isomizer may additionally separate the randomized structure into two layers to effect further randomization, and then recombine them with the result that the final randomized structure may have regained a laminar nature.

BRIEF DESCRIPTION OF DRAWINGS

In order to more fully illustrate the invention reference is made to the accompanying drawings in which:

In FIG. 2 there are two distinct zones 9 of different fiber content than zones 7, as more fully described below. The entire non-woven fabric with its several zones is lined for cutting into breast sections for use in coat or jacket manufacture.

Figure 1:
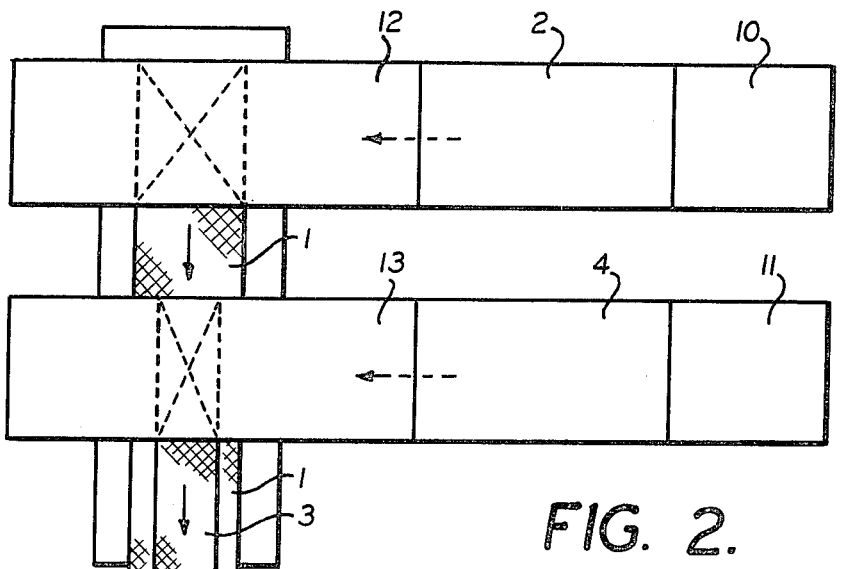
FIG. 1 is a diagrammatical plan view showing in diagrammatical form a series of apparatuses which can be employed pursuant to the process of the invention to prepare a new interlining material.

In the drawings at FIG. 1 there is shown the cross section of the interlining 6, the cross section being shown at the bottom of FIG. 1 as a portion of the drawing including the apparatus employed for the manufacture of such interlining.

DESCRIPTION OF SPECIFIC EMBODIMENTS

A suitable process of forming the fleece is shown diagrammatically in FIG. 1 of the accompanying drawings. In this a primary fleece 1 is made in conventional manner by feeding fibers from a hopper 10 into a card or garnett 2 and forming the resultant batt into the fleece by cross lapping by a cross lapper 12, and a secondary fleece 3 is made by feeding coarser fibers from a hopper 11 into a card or garnett 4 and forming the resultant batt into the secondary fleece by a cross lapper 13 that deposits it on part only of the primary fleece. The composite fleece, consisting of laminar fleece 3 laying on laminar fleece 1 is then passed through a Garnett machine, or other randomizer, 5 to form a fleece 6 which is shown as having outer thin zones 7, a thick zone 8 and an intermediate regions 9 in which the fiber weight drops gradually from the weight in zone 8 to the weight in zones 7. The transitional zones 9 may be up to about 10 cms. wide and the overall width of the whole web structure will of course depend upon the width of the ingoing laminar web which in turn must relate to the width of the randomizing machine.

The resultant unbonded web, or fleece, may then be bonded in conventional manner, for example by impregnation with an suitable bonding agent which may then be dried and cured in conventional manner. As is well known, the application of bonding agent is normally conducted so as to achieve uniform amounts of bonding agent across the width of the web but preferably in the invention the bonding agent is applied with a non-uniform, multizonal distribution, as described in our copending Application, filed on even date herewith, Ser. No. 571,888, filed Apr. 25, 1975 corresponding to British Application No. 9438/74. Thus the area of the web may comprise second zones each of which have substantially uniform binder content, adjacent second zones having different binder content. These adjacent second zones may also merge into one another. Preferably the binders in adjacent zones are differently colored. The binder may be applied by printing but preferably is applied by spraying, or most preferably, doctoring. Thus conveniently we may impregnate by doctoring viscous or foamed binder composition into the nonwoven web as the web passes between a support surface and a doctoring means that confines a pool of the composition on the web across the width of the web and dividing the pool into at least two sections by a baffle that prevents, or restricts a controlled amount, transfer of composition from one section to an adjacent section, different binder composition being supplied to adjacent sections.

The first and second zones may or may not coincide. Thus the change in binder content can be at a position different from the change in fiber content.

Bonding of the multizonal fiber web can instead or in addition be achieved by including in at least one of the first zones fusible fibers that can be fused by heating to bond fibers in that zone to one another. For instance bi-component fibers that have a sheath which will fuse may be used.

The interlining can be positioned in the jacket or other garment in a convenient manner, for example by stitching or by adhesion. Thus interlinings according to the invention may carry over part or all of their surface area, usually on one side only, thermoplastic adhesive so as to render them fusible. The thermoplastic adhesive is generally applied as a discontinuous coating by scattering, spraying or printing. Any suitable fusible interlining adhesive and method of application may be used. The adhesive may be applied uniformly or it, too, may have a multizonal distribution. Thus the area of the web may also comprise third zones, each of which have a substantially uniform adhesive coating and in which adjacent third zones have different adhesive coatings. As mentioned, the first zones preferably extend in the longitudinal direction and so also do the second zones (of binder) and/or third zones (of adhesive). Again the third zones may or may not coincide with the first zones.

As an example of the invention, by use of apparatus such as that illustrated in the accompanying drawings it is easily possible to make a web 190 cm. wide which has a central area 1 meter wide with a weight of, for instance, 90 g/m$^2$, 40 gms of which could be 20 denier nylon fibers, the remainder being finer fibers of 3 denier-8 denier. The outer edges, each approximately 45 cms. wide would be in each case 50 g/m$^2$ of only the finer components. The gradation between the light thin areas and the heavier central area would not be sharply defined because of the tendency for fiber to move laterally in the web handling machine. This web can then be fed through an impregnating system such as that illustrated in FIG. 5 of the said copending Application Ser. No. 571,888, filed Apr. 25, 1975 (British Application No. 9438/74) the disclosure of which is hereby incorporated herein by reference. Thus it can be fed through the nip between a doctoring roll and a supporting roll and foamed binder composition can be provided to the nip. Four baffles can be provided, one on each side of each zone 9. A first foamed binder composition can then be supplied to each of the zones 7, a second foamed binder composition can be fed to the zone 8 and a third binder composition, that is often a mixture of the first and second or is at least designed to give properties intermediate those of the first and second, can be fed to the zones 9.

In particular a binder composition and method as described in the Example of the said co-pending Application can be used.

Alternatively, the baffles separating one bonding agent from another can be offset from the edges of the fiber zones 7, 8 and 9 so that the multizonal distribution of bonding agent is different from the multizonal distribution of fibers.

In a preferred system there may be, e.g., only two baffles (thus providing only three zones) and the merging areas are provided by allowing binder to flow over and/or under the baffle.

The non-woven interlinings of the invention are of particular value where they are to be used in the manufacture of garments such as jackets where different reinforcing properties are required in different parts of the garment. Traditionally this has been achieved by the use of two or more different pieces of interlining fabrics, but by appropriate choice of the zones of fiber and bonding agent it is now possible to make such garments using a single piece of interlining as all or part of the reinforcement.

Figure 2:
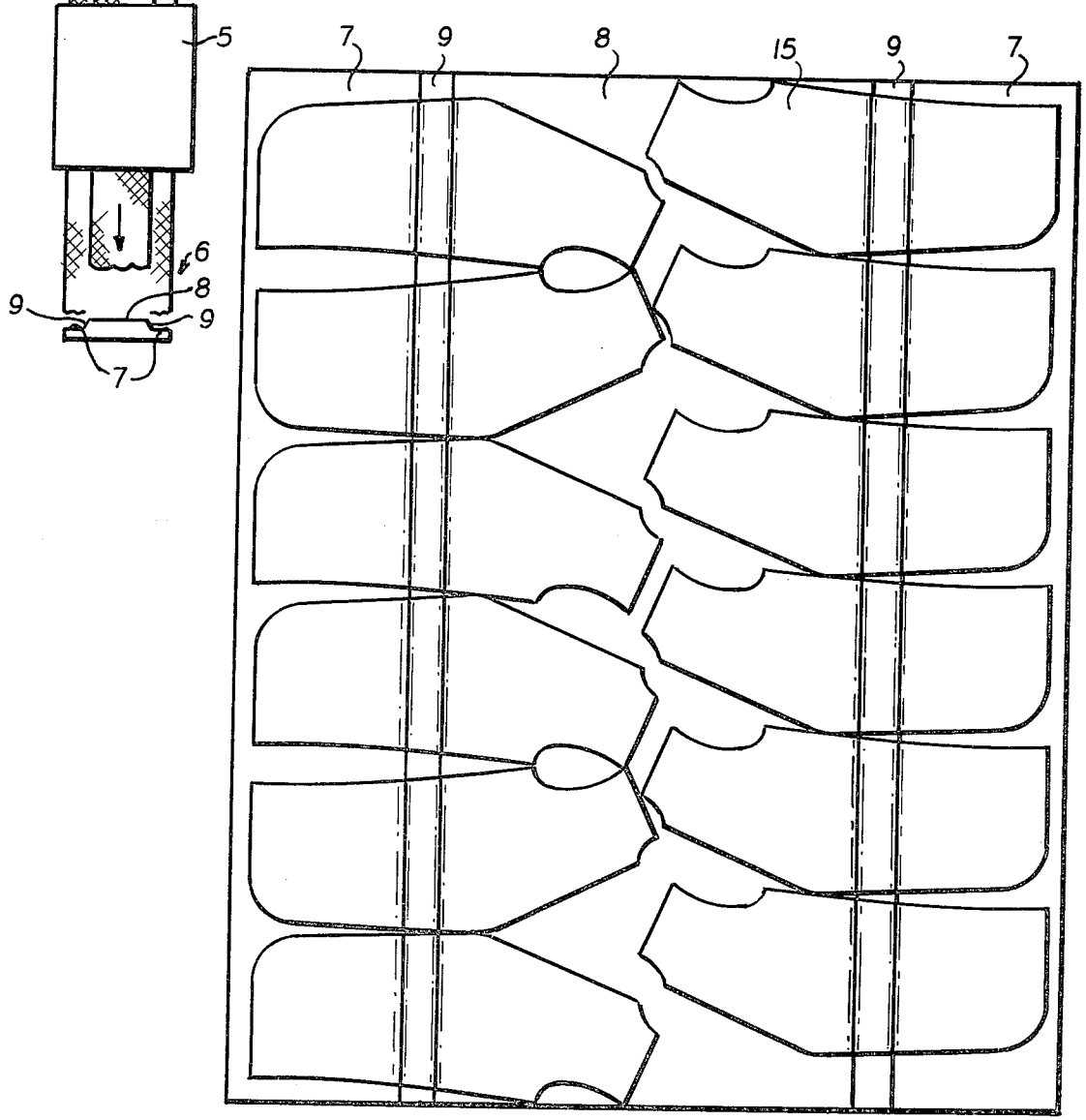
FIG. 2 is a plan view of an interlining material of the invention showing separate zones having different fiber content.

In FIG. 2 of the accompanying drawings we show diagrammatically how interlining patterns may be laid on a length of multizonal fabric 15 to mark how the interlining is to be cut. The fabric is made up of zones 7, 9, 8, 9 and 7. The properties, such as bulk and stiffness, of zone 9 are between those of zones 7 and 8, with zones 8 being the stiffest and bulkiest. In practice patterns would normally be laid so that the transitional zone (9) falls immediately below the top button position of the jacket forepart interlining.

If desired the interlining can be subjected to conventional treatments, such as calendering or slitting.

It is to be understood that the interlining of the present invention can be made in several different forms. For instance, one fleece can be disposed over a second fleece so that the second fleece overlaps the first fleece on only one end or edge thereof. After the randomization there is obtained an interlining material characterized by two zones each of which has substantially uniform fibers therein but of different fiber content. The fibers are joined by the randomization, especially at the margin of the zones.

On the other hand, it is possible, as illustrated in the drawings, to dispose a fleece lengthwise over a second fleece lying therebeneath also running in the lengthwise direction such that the upper fleece overlies only a portion of the lower fleece leaving a portion of the lower fleece exposed on either longitudinal side of the upper fleece. When the randomization is effected there is provided a web composed of a plurality of fleece materials which has three distinct zones, two of which have a uniform fiber content which is identical with one another. The third zone, located between these zones of like fiber content, separates the same and has a different fiber content. In the first instance described above there are only two zones whereas in the second instance there are three zones, the ones on either side of the centrally disposed piece having the same fiber content and being of like composition.

What is claimed is:

1. A garment interlining material comprising a non-woven web of fibers customarily used for the formation of non-woven garment interlinings wherein the area of said web comprises at least one distinct first zone across its width, said zone having at least 10 cm width and running lengthwise and having substantially uniform fiber amount therein, said zone disposed adjacent a second zone having different fiber amount than said first zone, the fibers of said first zone merging into the fibers of said second zone thereby forming a transitional zone between said first zone and said second zone having a fiber amount intermediate said first zone and said second zone, said transitional zone having a width of at least 3 cm.

2. An interlining material according to claim 1 wherein said transitional zone contains a mixture of different fibers.

3. An interlining material according to claim 1 wherein the area of the web comprises zones which each have substantially uniform binder content and in which adjacent said zones have different binder content.

4. An interlining material according to claim 1 carrying a discontinuous adhesive coating.

5. An interlining according to claim 4 wherein the web comprises first zones which each have a substantially uniform adhesive coating and a third zone having different adhesive coatings.

6. A continuous length of interlining material according to claim 1 wherein the fibers in said zones are oriented in said length direction.

7. An interlining material according to claim 1 wherein said fibers are staple fibers.

8. An interlining material according to claim 7 wherein said staple fibers are non-needled and said staple fibers are substantially randomly distributed throughout the thickness of the web.

9. An interlining material according to claim 1 wherein said web is a needled web.

10. An interlining material according to claim 1 wherein said fibers are continuous.

11. An interlining material according to claim 1 wherein at least one of said zones contains binder fibers.

12. A garment interlining according to claim 1 wherein the fiber bulk of said first zones is different from the fiber bulk of said third zone and the fiber bulk of said transitional zone.

13. An interlining material according to claim 1 wherein said interlining material has on opposed sides thereof longitudinally running edge zones of at least 10 cm width whose fiber amount is uniform and is the same as one another, said edge zones being disposed on either side of a longitudinally running central zone of fiber amount different from said edge zones, said central zone having a width of at least 10 cm, the fibers of said central zone merging on its respective side edges with the fibers of the respective edge zones to form a pair of longitudinally running transition zones on either side of said central zone, each of which has a width of at least 3 cm, the fiber amount of said transitional zone being intermediate the fiber amount of the edge zone, on the one hand, and said central zone on the other.

14. A method of making a garment interlining material comprising a non-woven web of fibers customarily used for the formation of non-woven garment interlinings wherein the area of said web comprises at least one distinct first zone across its width, said zone having at least 10 cm width and running lengthwise and having substantially uniform fiber amount therein, said zone disposed adjacent a second zone having different fiber amount than said first zone, the fibers of said first zone merging into the fibers of said second zone thereby forming a transitional zone of width at least 3 cm between said first zone and said second zone having a fiber amount intermediate said first zone and said second zone which comprises disposing a first fibrous fleece over a second fibrous fleece so as to define a web having at least two distinct zones, each of which zones has substantially uniform fiber amount and adjacent said zones having different fiber amounts, and thereafter randomizing the distribution of fibers through said web and merging the fibers of said first fibrous fleece and said second fibrous fleece to define a transitional zone of width of at least 3 cm.

15. A method according to claim 14 wherein said first fibrous fleece and said second fibrous fleece are cross-laid.

16. A method according to claim 14 wherein the fiber bulk of said first fleece is different from the fiber bulk of said second fleece and the transitional zone formed by randomizing the distribution of fibers of said first fleece with the fibers of said second fleece.

* * * * *